United States Patent
Momozu et al.

(10) Patent No.: US 7,562,603 B2
(45) Date of Patent: Jul. 21, 2009

(54) PARKING BRAKE APPARATUS

(75) Inventors: Masateru Momozu, Wako (JP); Naoto Shibui, Wako (JP); Hideto Nebuya, Wako (JP); Satoru Masuda, Yokohama (JP); Yukiyoshi Akutsu, Yokohama (JP); Tomoya Sugiyama, Yokohama (JP)

(73) Assignees: Honda Motor Co., Ltd., Tokyo (JP); Otsuka Koki Co., Ltd., Yokohama-shi (JP)

( * ) Notice: Subject to any disclaimer, the term of this patent is extended or adjusted under 35 U.S.C. 154(b) by 334 days.

(21) Appl. No.: 11/469,046

(22) Filed: Aug. 31, 2006

(65) Prior Publication Data

US 2007/0080029 A1 Apr. 12, 2007

(30) Foreign Application Priority Data

Aug. 31, 2005 (JP) ............................. 2005-251737

(51) Int. Cl.
*F16C 1/10* (2006.01)
(52) U.S. Cl. ............................. 74/535; 74/523; 188/20
(58) Field of Classification Search ................ 74/501.5, 74/501.5 R, 501.6, 523, 529, 535; 188/2 D, 188/2 R, 196 BA
See application file for complete search history.

(56) References Cited

U.S. PATENT DOCUMENTS 6,286,389 B1 * 9/2001 Papadatos .................... 74/535
6,662,676 B2 * 12/2003 Dittmar et al. ........... 74/501.5 R
6,973,852 B2 * 12/2005 Shin et al. .................... 74/535
2005/0029057 A1 2/2005 Jeon
2005/0092559 A1 * 5/2005 Shin et al. ............. 188/196 BA
2006/0230867 A1 * 10/2006 Nitsche ..................... 74/501.6

FOREIGN PATENT DOCUMENTS

| CN | 1368921 | 9/2002 |
|---|---|---|
| DE | 2 226 967 | 12/1973 |
| DE | 20 2004 014 335 | 11/2004 |
| WO | 2005/097529 | 10/2005 |

* cited by examiner

*Primary Examiner*—Christopher P Schwartz
(74) *Attorney, Agent, or Firm*—Rankin, Hill & Clark LLP

(57) ABSTRACT

A parking brake apparatus has a base, a ratchet plate fixed to the base, an operation lever includes a rotational base portion pivotally supported on the base; a pawl adapted to engage/disengage with the ratchet plate; an arc-shaped intermediate member comprises an arc-shaped relay rod; and a grip for controlling the engagement of the pawl. The arc-shaped relay rod is divided into at least two and is made to be interlocked with operations by the grip to transmit an engagement/disengagement operation with the ratchet plate to the pawl, the ratchet plate and the rotational base portion are provided inside a body side mounting portion, and the intermediate member is provided in such a manner as to appear from and disappear into a passage hole in the body side mounting portion.

5 Claims, 5 Drawing Sheets

PARKING BRAKE APPARATUS

BACKGROUND OF THE INVENTION

1. Field of the Invention

The present invention relates to a parking brake apparatus which operates to apply the parking brake via a brake cable by operating an operating lever having a pawl adapted to engage with and disengage from a ratchet plate fixedly provided on a base to rotate.

2. Description of the Background Art

As a conventional parking brake apparatus, there is an automotive parking brake apparatus generally referred to as a hand-operated lever type parking brake apparatus having an operating portion as shown, for example, in FIG. 5. In this type of parking brake apparatus, an operating lever 202 is pivotally supported on a base 200 which is fixedly provided on a floor side of a vehicle in such a manner as to rotate about a pivot shaft 201. In addition, a ratchet plate 203 is fixedly provided on the base 200. A pawl 204 is pivotally supported on the operating lever 202 in such a manner as to be brought into engagement with and disengagement from a toothed portion of the ratchet plate 203.

A cable drum 205 is provided in a lower portion of the operating lever 202, and when the operating lever 202 is rotated to rise, a brake cable 206 is taken up by the cable drum 205, whereby a braking portion applies the brake. The brake-applied state can be held by causing the pawl 204 to be locked on the ratchet plate 203.

In the parking brake apparatus having the operating portion of this type, while the operating lever 202 is generally mounted in a center console in such a state that the operating lever 202 is exposed therefrom, since there should be nothing that interrupts the operation of the operating lever 202 in the operating area thereof, there is caused a problem that an accommodating space provided in the center console for accommodating a cup or the like is limited.

As a solution to this problem, there exists a parking brake apparatus that is disclosed in Germany Patent Examined Publication DE 2 226 967. Namely, this parking brake apparatus is such that an arc-shaped long arm member which extends upwards is provided at a distal end portion of an intermediate member which is mounted in such a manner as to rotate at a proximal end portion thereof, a grip is provided at an upper end portion of the arm member, and the intermediate member is accommodated inside a center console in such a manner that most of the arm member appears from the inside of the center console to the outside thereof and disappears from the outside of the center console into the inside thereof as the parking brake apparatus is operated, whereby an accommodating space provided in the center console is not limited. In this parking brake apparatus, a release rod provided in the grip is made to be operated by a release button so as to cause a relay rod securely inserted within the arm member to operate via a link.

In the related art like this, however, the relay rod which receives the operation of the release rod via the link deflects in a direction in which the relay rod is brought into collision with the arm member. To prevent the interference of the relay rod with the arm member, a clearance needs to be provided between the relay rod and the arm member, and to make this happen, the arm member has to be made thick. However, making the arm member thick results in limitation on the accommodating space formed in the center console for accommodation of a cup or the like, leading to a problem that space saving cannot necessarily be implemented effectively.

In addition, although the interference between the arm portion and the relay rod could be eliminated even in the event that the relay rod deflected by providing the aforesaid clearance, there was caused a problem that the transmission stroke for transmitting the operation of the relay rod was lost by the deflection of the relay rod.

SUMMARY OF THE INVENTION

The invention was made in view of the problem like this which is inherent in he related art, and an object thereof is to provide a parking brake apparatus which reduces not only the limitation on the space in the body side mounting portion but also the loss of the transmission stroke of the relay rod.

The gist of the invention made to achieve the object resides in an invention described in each of the following items.

[1] A parking brake apparatus (1) which operates a parking brake comprising:
a base (2) comprising a pivot shaft (22);
a ratchet plate (3) fixed to the base (2);
an operation lever (4) comprising:
a rotational base portion (30) which is pivotally supported on the base (2) by the pivot shaft (22) at one end portion thereof and to which a brake cable is connected;
a pawl (40) that is pivotably supported on the rotational base (30) and is adapted to engage/disengage with the ratchet plate (3);
an arc-shaped intermediate member (50) that extends upwards and rearwards from the other end portion of the rotational base portion (30) and comprises an arc-shaped relay rod (51) within an interior thereof; and
a grip (60) that is mounted on an upper end portion of the intermediate member (50) at a proximal end portion (60a) thereof for controlling the engagement of the pawl (40) with the ratchet plate (3),
wherein the arc-shaped relay rod (51) is divided into at least two and is made to be interlocked with operations by the grip (60) to transmit an engagement/disengagement operation with the ratchet plate (3) to the pawl (40),
the ratchet plate (3) and the rotational base portion (30) are provided inside a body side mounting portion (100), and
the intermediate member (51) is provided in such a manner as to appear from and disappear into a passage hole (101) in the body side mounting portion (100).

[2] The parking brake apparatus (1) as set forth in item [1], wherein the relay rod (51) which is divided into at least two comprises a connecting portion (520) connecting the divided relay rods, and
the connecting portions (520) is guided by an interior wall side of the intermediate member (50) during an operation of the operation lever (4).

[3] The parking brake apparatus (1) as set forth in item [2], wherein the connecting portion (520) is made up by combining together a raised portion (513) formed at an end portion of one of the relay rods (51b) and a recess portion (512) formed on an end portion of the other relay rod (51a).

[4] The parking brake apparatus (1) as set forth in item [1], wherein the grip (60) comprises a release rod (62), and wherein a rotational link (70) for transmitting operations of the release rod (62) and the relay rod (51) therebetween is provided within a joining portion (56) where the grip (60) and the intermediated member (50) are joined together.

[5] The parking brake apparatus (1) as set forth in item [1], wherein the relay rod (51) comprises, at a lower end portion thereof, a pawl releasing portion (52) which rotates the pawl (40) in a direction releasing an engagement with the ratchet plate (3).

The invention functions as follows.

In the parking brake apparatus (1), the base (2), the ratchet plate (3) which is fixedly provided on the base (2) and the rotational base portion (30) of the operating lever (4) are provided inside the body side mounting portion (100), and the rotational base portion (30) is pivotally supported on the base at one end portion by the pivot shaft (22), so as to rotate about the pivot shaft (22). The pawl (40) which is pivotally supported at the other end portion of the rotational base portion (30) can be rotated in such a manner as to be brought into engagement with and disengagement from the ratchet plate (3).

The intermediate member (50) which extends upwards and rearwards from the other end portion of the rotational base portion (30) can be made to appear from and disappear into the passage hole (101) in the body side mounting portion (100) in conjunction with the rotation of the rotational base portion (30). In other words, the intermediate member (50) moves along with its longitudinal direction so as to penetrate through the passage hole (101). The grip (60) mounted on the upper end portion of the intermediate member (50) controls an operating knob (61) coupled to the release rod (62) so as to effect a releasing operation for releasing the lock of the pawl (40) relative to the ratchet plate (3). This intermediate member (50) sinks deepest inside the body side mounting portion (100) when the parking brake apparatus (1) applies no brake.

When the grip (60) is gripped to pull up the operating lever (4) so as to cause the parking brake apparatus (1) to apply the brake, the portion of the intermediate member (50) which sinks to disappear into the body side mounting portion (100) is pulled out of the passage hole (101) in the body side mounting portion (100), and inside the body side mounting portion (100) the rotational base portion (30) to which the intermediate member (50) is coupled pivots or rotates upwards. Then, the brake cable coupled to the rotational base portion (30) is pulled on as the rotational base portion (30) so rotates, whereby the brake starts to be applied. In addition, the pawl (40) repeats the engagement with and disengagement from the ratchet plate (3) as the rotational base portion (30) rotates.

When the pulling up of the operating lever (4) is stopped, the pawl (40) is locked on the ratchet plate (3) so as to be held in a state that results then, whereby the brake cable is also held in the pulled state, and the parking brake apparatus (1) is held in the brake-applying state.

To return the parking brake apparatus (1) from the brake-applying state to a non-brake-applying state, the operating knob (61) of the grip (60) is pushed into the grip (60) so as to put the release rod (62) into operation. The operation of the release rod (62) is then transmitted to the relay rod (51) by a linkage member (70). This linkage member (70) is brought into abutment with the release rod (62) at one end portion thereof and with the relay rod (51) at the other end portion thereof. Since the linkage member (70) is pivotally supported in such a manner as to rotate inside the joining portion between the grip (60) and the intermediate member (50), no physically abnormal sensation is felt by the driver when he or she grips the grip (60), and a shape can be designed which naturally continues from the grip (60) to the intermediate member (50).

The linkage member (70) rotates in a direction in which an upper end portion of the relay rod (51) of the plurality of divided relay rods (51) which lies at an uppermost position is pushed downwards. The connecting portion (520) between the plurality of divided relay rods (51) is made up by combining together the raised portion (513) formed on the end portion of the relay rod (51b) and the recess portion (512) formed on the end portion of the other relay rod (51a). For example, the raised portion (513) is formed such that a tapered distal end of the raised portion (513) is rounded, while the recessed portion (512) is formed so as to have a cut which matches the raised portion (513), and these raised portion (513) and the recess portion (512) may be brought into abutment with each other to get together. The connecting portion (520) where the raised portion (513) and the recess portion (512) are connected to each other is guided by the interior wall side of the intermediate member (50) during operation, whereby the relay rod (51) is prevented from being deformed or collapsed inside the intermediate member (50) and is pushed downwards smoothly and securely without producing a transmission loss.

When the relay rod (51) is pushed downwards in this way, the pawl releasing portion (52) provided at the lower end portion of the relay rod (51) which lies at a lowermost position is brought into abutment with the pawl (40) so as to rotate the pawl (40) in the direction in which the locking of the pawl (40) with the ratchet plate (3) is released. When the pawl (40) is released from the locking with the ratchet plate (3), the brake cable which has been pulled out is withdrawn, and therefore, in the event that the operating lever (4) is allowed to move as is pulled by the cable so withdrawn, the parking brake apparatus (1) can be restored to the non-brake-applying state.

ADVANTAGES OF THE INVENTION

According to the parking brake apparatus described under [1] of the invention, since the parking brake apparatus is configured only such that the ratchet plate and the rotational base portion which pivotally supports the pawl which is brought into engagement with and disengagement from the ratchet plate are provided inside the body side mounting portion, the operating lever extends upwards and rearwards from the other end portion of the rotational base portion, and the arc-shaped intermediate member having the grip at the upper end portion thereof is made to appear from and disappear into the passage hole in the body side mounting portion, the limitation on the space inside the body side mounting portion can be reduced, thereby making it possible to realize the effective use of the body side mounting portion.

Furthermore, since the arc-shaped relay rod is provided in the intermediate member while being divided into at least two which is adapted to be interlocked with the operations by the grip to bring the pawl into engagement with and disengagement from the ratchet plate so as to transmit the engagement and disengagement operations by the grip to the pawl, the length of each of the relay rods is shortened, so as to obtain high rigidity, whereby even in the event that a load is applied to the relay rod in a direction in which the relay rod extends due to the transmission of the engagement and disengagement operations, the relay rod is made difficult to curve or deflect, and therefore, the relay rod can be made thin, so as not only to reduce not only the limitation on the space in the body side mounting portion but also the loss of the transmission stroke of the relay rod. Thus, the transmission of the engagement and disengagement operations can be implemented in a more ensured fashion.

According to the parking brake apparatus described under [2] of the invention, since the relay rod so divided is guided by the interior wall side of the intermediate member at least the connecting portion of the divided relay rods while the relay rod is operating to transmit the engagement and disengagement operations with and from the ratchet plate to the pawl, the deflection of the relay rod during its operation can be suppressed in a more ensured fashion, thereby making it possible to allow the relay rod to transmit the engagement and disengagement operations in the more ensured fashion.

According to the parking brake apparatus described under [4] of the invention, since in the divided relay rods, the raised portion formed on the end portion of the one of the relay rods and the recess portion formed on the end portion of the other relay rod are combined together to make up the connecting portion, the relay rods can be coupled to each other easily.

According to the parking brake apparatus described under [4] of the invention, since the linkage member adapted to transmit the operations of both the release rod provided on the grip in such a manner as to be operated and the relay rod inside the intermediate member to each other is provided in the joining portion between the grip portion and the intermediate portion, no physical abnormal sensation is felt by the driver when he or she grips the grip, and the shape of the parking brake apparatus can be designed to continue naturally from the grip to the intermediate member.

DETAILED DESCRIPTION OF THE PREFERRED EMBODIMENTS

Figure 1:
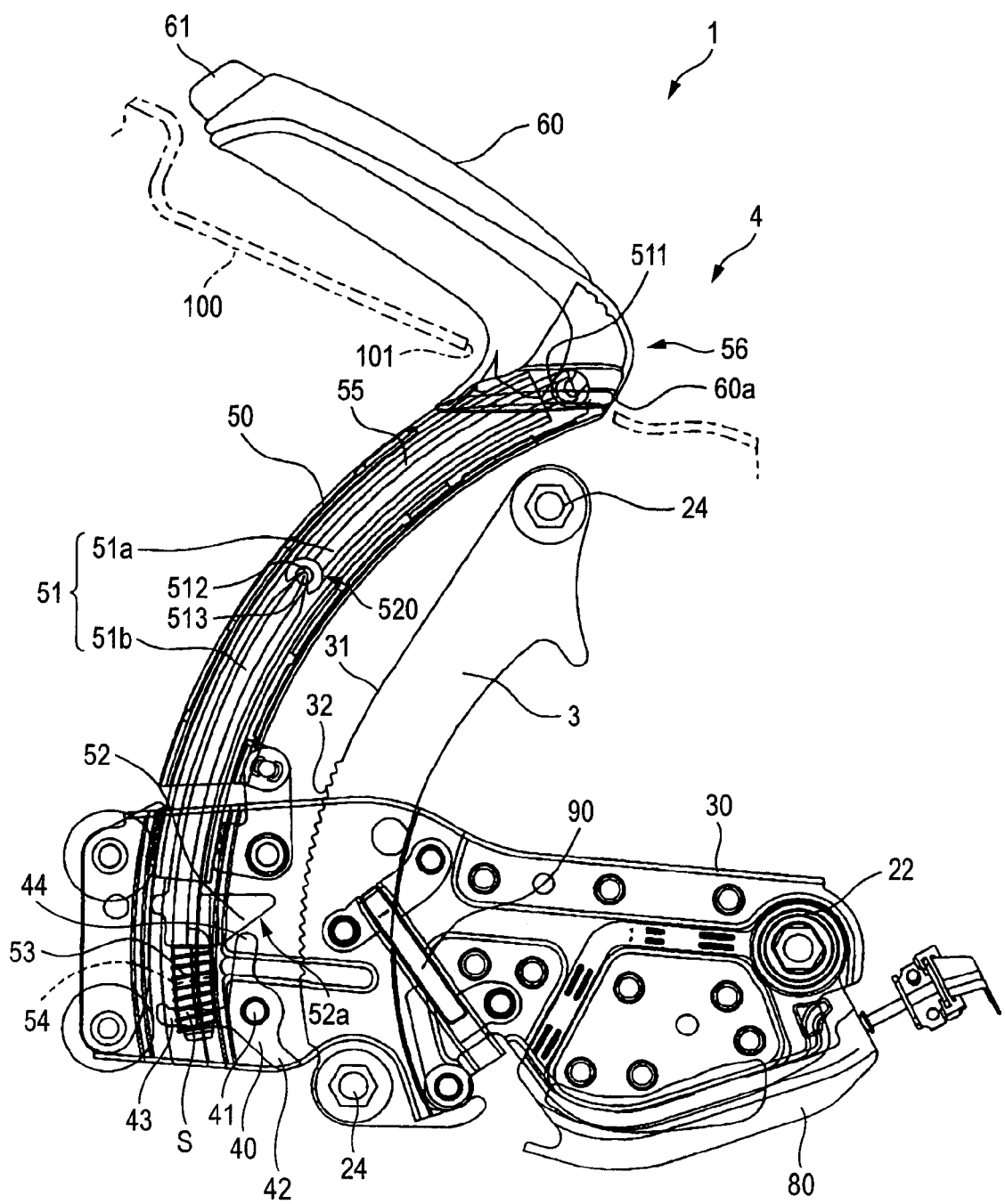
FIG. 1 is a right side view which shows an operating handle of a parking brake apparatus according to an embodiment of the invention.
Figure 2:
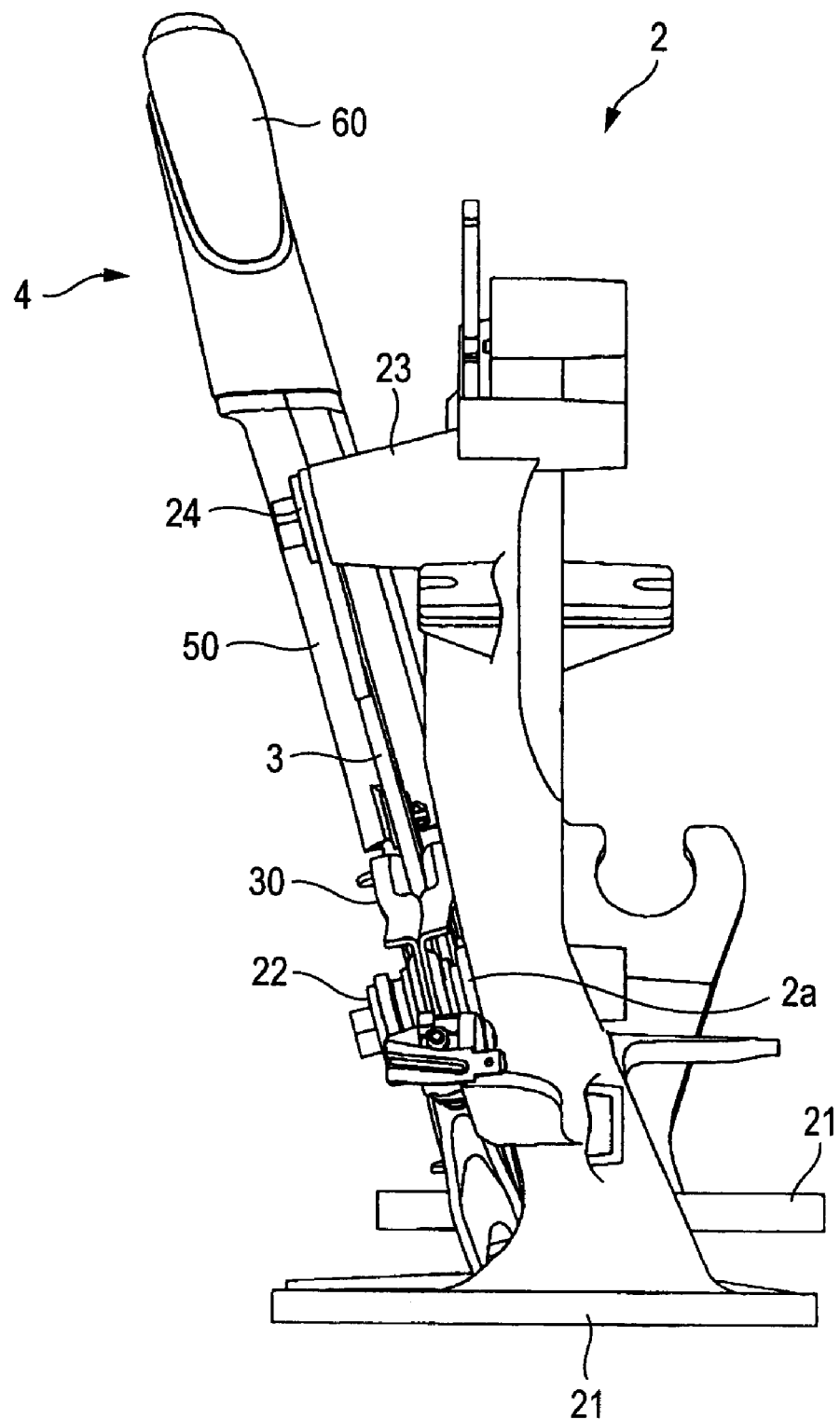
FIG. 2 is a back view which shows a state in which the operating handle of the parking brake apparatus according to the one embodiment of the invention is fixedly provided on a base.

Hereinafter, one preferred embodiment of the invention will be described based on the accompanying drawings.

FIGS. 1 to 4 illustrates one embodiment of the invention.

As is shown in the figures, a parking brake apparatus 1 according to the embodiment of the invention is a parking brake apparatus which operates to apply the brake via a brake cable, not shown, by operating to rotate an operating lever 4 which has a pawl 40 adapted to be brought into engagement with and disengagement from a ratchet plate 3 fixedly provided on a base 2.

The base 2 is fixed to a floor of a vehicle at bolt flanges 21 thereof by bolts. This base is provided inside and below a center console 100 (the vehicle side mounting portion).

The operating lever 4 includes a rotational base portion 30 which is pivotally supported at one end portion on a pivotally supporting portion 2a of the base 2 by a pivot shaft 22, a tubular intermediate member 50 which extends upwards and rearwards from the other end portion of the rotational base portion 30 into an arc-like shape, a grip which is mounted on an upper end portion of the intermediate member 50 at a proximal end portion 60a thereof and a linkage member 70 which is pivotally supported within a joining portion 56 between the grip 60 and the intermediate member 50. The ratchet plate 3 and the rotational base portion 30 are provided inside the center console 100. In addition, the intermediate member 50 passes through a passage hole 101 formed in the center console 100 to come out of the center console 100 and is made to appear from and disappear into the passage hole 101 in the center console 100 as the rotational base portion 30 rotates.

The rotational base portion 30 is made up of two sheets of metal which are pressed and combined together and is pivotally supported on the base 2 in such a manner as to rotate by the pivot shaft 22. The pivot shaft 22 also pivotally supports a push wire guide 80. The push wire guide 80 is assembled to the rotational base portion 30, and a brake cable, not shown, which is made to extend thereto from a brake unit (not shown) lying at a rearward position is wound round the push wire guide 80 below the pivot shaft 22. A cable guide 90 is fixed to an intermediate portion of the rotational base portion 30 ahead of the push wire guide 80. The brake cable is passed through the cable guide 90 so as to be fixed to the rotational base portion 30 at an upper end portion of the cable guide 90.

The ratchet plate 3 is provided on the rotational base portion 30 at a position which is closer to the intermediate member 50 than the intermediate portion thereof. This ratchet plate 3 is provided in such a manner as to pass though a gap formed at a joint where the two sheets of metal making up the rotational base portion 30 are jointed together. The ratchet plate 3 is an arc-shaped sheet of metal which extends rearwards while extending upwards from a lower end portion to an upper end portion thereof, and the lower end portion and the upper end portion are fixed to ratchet plate fixing portions with bolts 24, respectively. This ratchet plate 3 has a toothed portion 32 where a plurality of teeth are formed at an outside diameter portion 31 thereof which is close to the intermediate member 50.

A pawl 40 is pivotally supported by a pin 40 in such a manner as to rotate on the other end portion side of the rotational base portion 30 in an intermediate position between the intermediate member 50 and the ratchet plate 3. This pawl 40 has a tooth 42 which is brought into engagement with and disengagement from the toothed portion 32 of the ratchet plate 3, a spring abutment portion 43 which is brought into abutment with a coil spring S mounted on a lower end portion of a relay rod 51, which will be described later on, to receive a biasing force applied thereto in a direction in which the tooth 42 is locked on to the toothed portion 32 and a release cam abutment portion 44 which receives a force applied thereto in a direction in which the tooth 42 is released from the locking with the toothed portion 32 by the action of a release cam 52 (the pawl releasing portion) formed at a lower end portion of the relay rod 51, the tooth 42, the spring abutment portion 43 and the release cam abutment portion 44 being provided on the pawl 40 in such a manner as to extend in three directions.

The intermediate member 50, which is fixed to the other end portion of the rotational base portion 30, is formed into a tubular shape and is fixed in such a manner as to be held by the two sheets of metal making up the rotational base portion 30. The arc-shaped relay rod 51 is inserted into an interior of the intermediate member 50.

The relay rod 51 is divided into two upper and lower rods, and an upper rod 51a, which lies at an upper position, and a lower rod 51b, which lies at a lower position, are disposed in such a manner as to be brought into serial abutment. The overall lengths of the upper relay rod 51a and the lower relay rod 51b which are so divided become shorter than an overall length that results when the relay rod 51 is not so divided, and the rigidity of each of the divided relay rods 51 is increased, whereby since the possibility that the divided relay rods 51 are caused to deflect or distort as a whole is reduced further than the possibility that a single relay rod is caused to deflect or distort, the loss of a transmission stroke of the relay rod 51 is reduced.

The upper relay rod 51a has a recess portion 511 which is formed concavely at an upper end thereof and a recess portion 512 which is formed concavely at a lower end thereof. In contrast, the lower relay rod 51b has a raised portion 513 which is formed convexly at an upper end thereof and a spring mount portion 53 on which the coil spring S, which will be described later on, is mounted at a lower end thereof. The recessed portion 511 constitutes a portion which is brought into abutment with one end portion of the linkage member 70, which will be described later on, to thereby be coupled thereto.

The upper relay rod 51a and the lower relay rod 51b are assembled together at the recessed portion 512 and the raised portion 51b, respectively, so as to constitute a connecting portion 520. For example, the raised portion 513 maybe formed such that a tapered distal end thereof is rounded, while the recess portion 512 may be formed so as to have a cut which matches the raised portion 513, whereby these raised portion 513 and recess portion 512 are be brought into abutment with each other to be assembled together for connection. Alternatively, the raised portion may be formed in such a manner as to have part of a sphere, while the recess portion 512 may be formed so as to have a spherical surface which matches the raised portion 513, whereby these raised portion 513 and recess portion 512 are brought into abutment with each other so as to be assembled together for connection. In addition, the recess portion 512 may be formed at the upper end of the lower relay rod 51b, whereas the raised portion 513 may be formed at the lower end of the upper relay rod 51a.

At the connecting portion 520 between the upper relay rod 51a and the lower relay rod 51b the upper relay rod 51a and the lower relay rod 51b may only have to be brought into abutment with each other at their end portions which are formed as has been described above. Alternatively, the end portions of the individual relay rods may be formed into other shapes so that the upper relay rod and the lower relay rod are connected together at their end portions so formed with a pin or the like.

A guide member 55 which guides at least the connecting portion 520 is provided between the relay rod 51 and an interior wall side of the intermediate member 50 within the intermediate member 50. Although the guide member 55 is, for example, a tubular member which can accommodate therein the relay rod 51, the guide member 55 may be such as to be formed in such a manner that a clearance between the connecting portion 520 and itself is partially reduced within the intermediate member 50. In the event that the connecting portion 520 is formed thicker than other portions of the relay rod 51, the connecting portion 520 is guided by the guide member 55 while in operation, whereby the deflection of the relay rod 51 during its operation is suppressed, and the relay rod 51 is pushed downwards smoothly and securely without producing a transmission loss. In the event that the connecting portion 520 is not thicker than the other portions of the relay rod 51, the relay rod 51 is guided by the guide member 55 over substantially the entirety thereof.

The upper end portion of the upper relay rod 51a where the recess portion 511 is formed protrudes from the upper end of the intermediate member 50. A proximal end portion 60a of the grip 60 is fixed to an upper end portion of the intermediate member 50. The linkage member 70 is pivotally supported in such a manner as to rotate in the interior of the joining portion 56 where the grip 60 is fixed to the intermediate member 50 (refer to FIGS. 3 and 4). Due to this, no physically abnormal sensation is felt by the driver when he or she grips the grip 60, and the parking brake apparatus can be designed so as to realize a shape which naturally continues from the grip 60 to the intermediate member 50.

Figure 3:
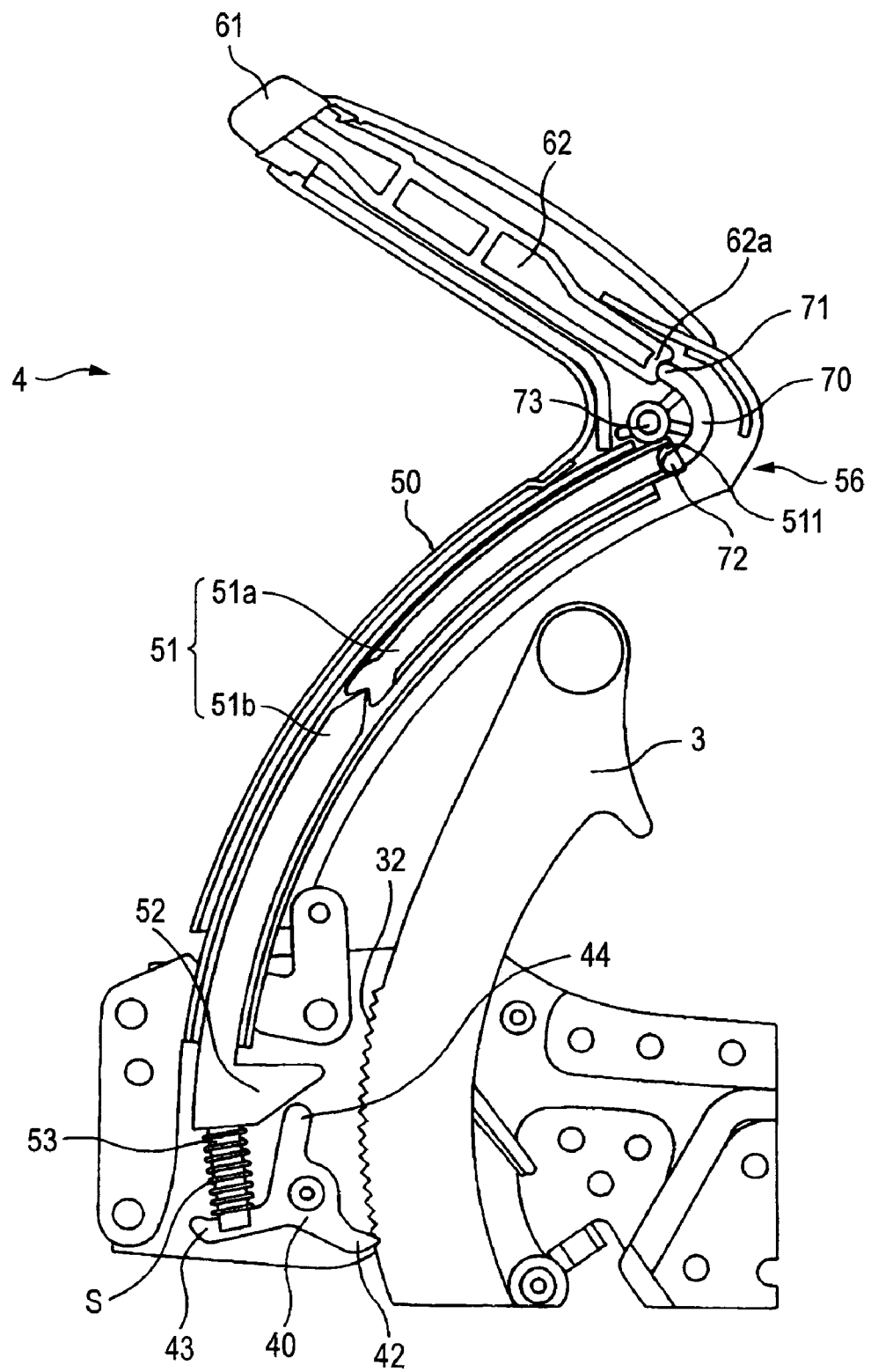
FIG. 3 is an explanatory diagram which explains states of individual constituent members which result when the parking brake apparatus according to the embodiment of the invention is caused to start applying the brake.
Figure 4:
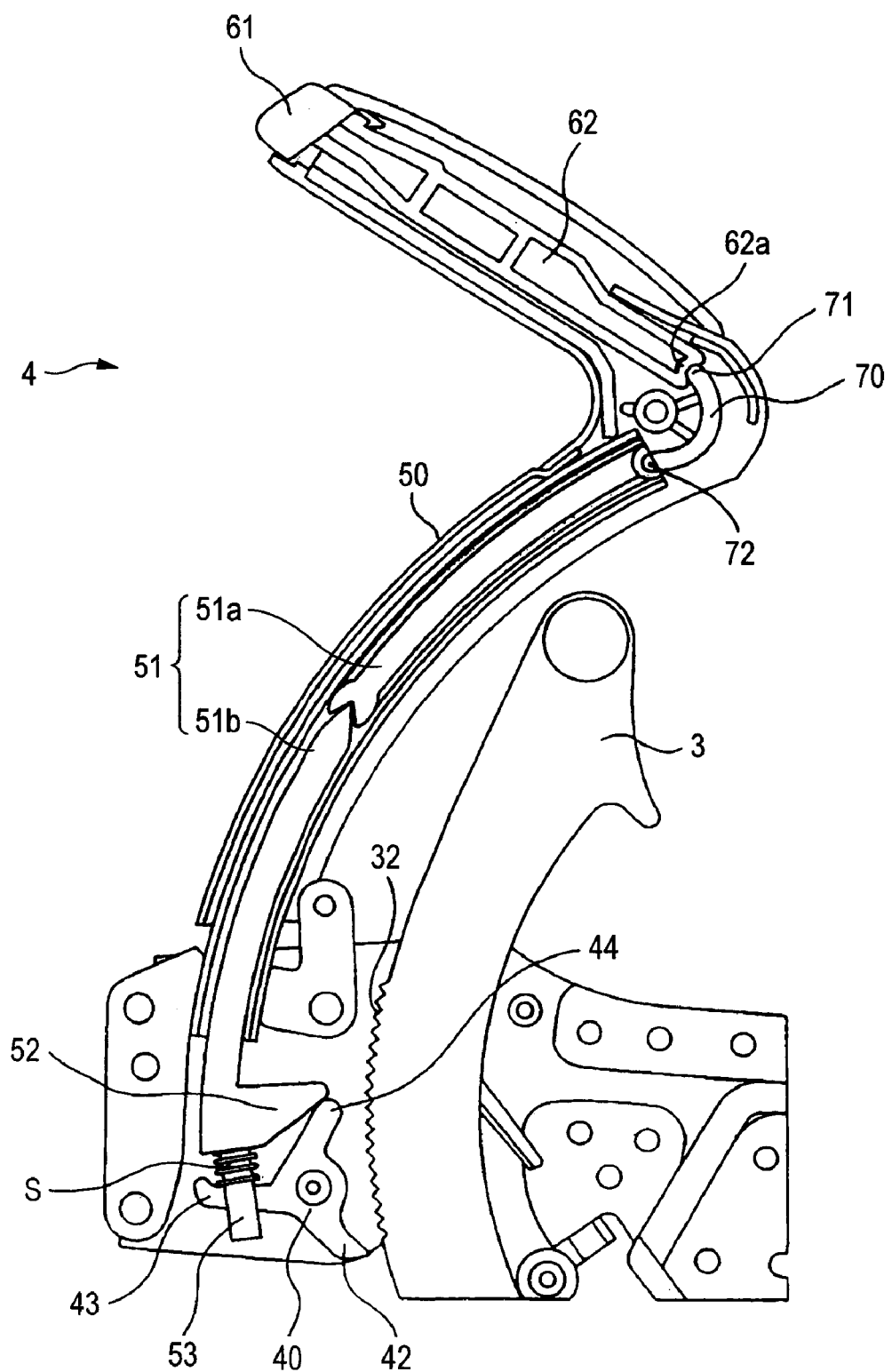
FIG. 4 is an explanatory diagram which explains states of the individual constituent members which result when the brake-applying state of the parking brake apparatus according to the embodiment of the invention is released.
Figure 5:
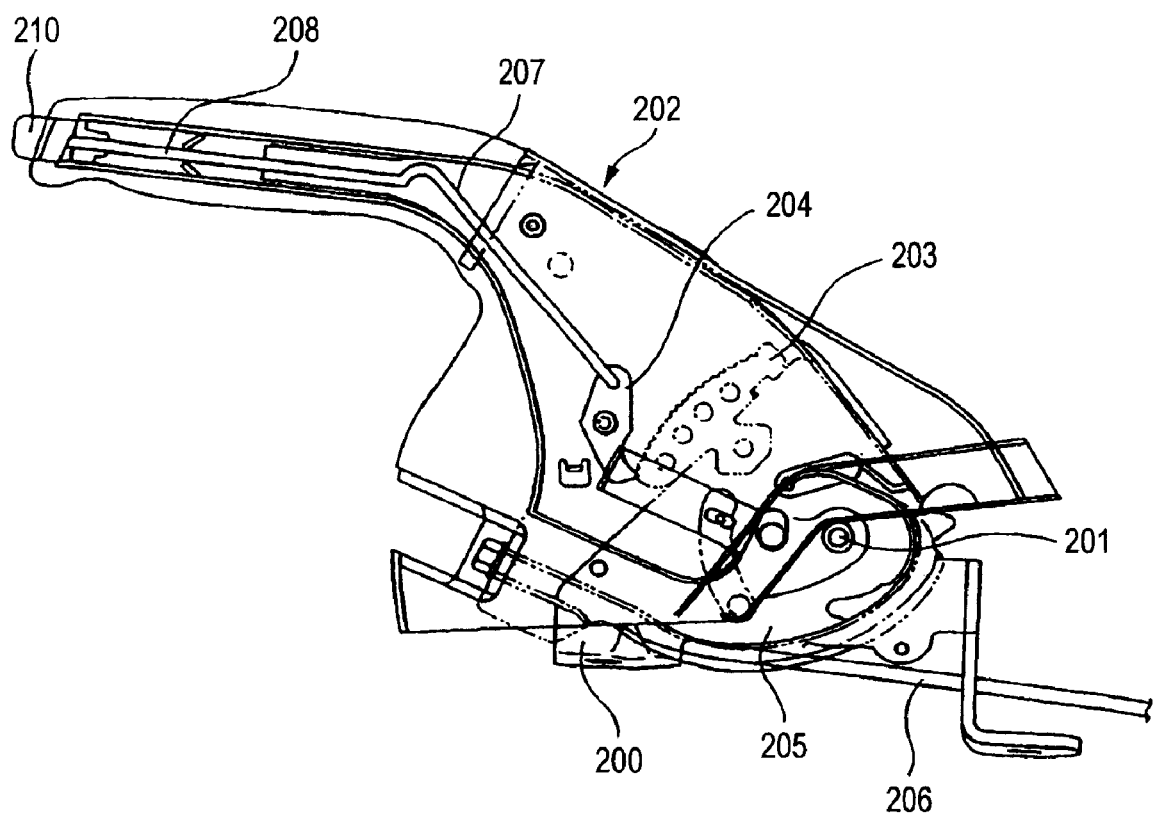
FIG. 5 is a right side view which shows a conventional example.

As is shown in FIGS. 3 and 4, a operating knob 61 is incorporated in a distal end portion of the grip 60 in such a manner as to appear from and disappear into the inside of the grip 60. The operating knob 61 is such as to put the relay rod 51 into operation so as to control the pawl 40. The operating knob 61 is made to lie in a non-operational position which protrudes farthest from the grip when it does not operate the pawl 40.

A release rod 62 is securely inserted into the grip 60, and the operating knob 61 is fixed to a distal end of the release rod 62. A proximal end portion 62a of the release rod 62 is brought into abutment with one end portion 71 of the linkage member 70.

The linkage member 70 is pivotally supported on the proximal end portion 60a of the grip 60 by a pivot shaft 73 inside the grip 60 and has an overall shape like a fan in which the pivot shaft 73 constitutes the center of the fan shape. The linkage member has an arc-like shape as viewed from the one end portion 71 to the other end portion 72 thereof, and the other end portion 72 is brought into abutment with the recess portion 511 at the upper end portion of the upper relay rod 51a, whereby the operating knob 61 and the relay rod 51 are connected together via the linkage member 70, so that the operating knob 61 and the relay rod 51 can be interlocked with each other. Consequently, the operation of the operating knob 61 can be transmitted to the relay rod 51 so as to rotate the pawl 40, whereby the tooth 42 of the pawl 40 can be released from the locking with the toothed portion 32 of the rotational base portion 30.

The release cam 52 which releases the tooth 42 of the pawl 40 from the locking with the toothed portion 32 of the rotational base portion 30 is formed on the lower relay rod 51b at a portion upper than a spring mounting portion 53 thereof. A lower portion of the lower relay rod 51b protrudes further downwards than a lower end of the guide member 55, and the release cam 52 and the spring mounting portion 53 are formed at the portion of the lower relay rod 51 which protrudes further downwards than the guide member 55.

The release cam 52 is formed in such a manner as to protrude horizontally from the lower relay rod 51b, and an inclined surface 52a is formed on an edge portion of the pawl 40 which is brought into abutment with the release cam abutment portion 44. This inclined surface 52a can rotate the pawl 40 by pushing the release cam abutment portion 44 when the release cam 52 is lowered.

The spring mounting portion 53 which is formed below the release cam 52 is formed thinner than the other portion of the lower relay rod 51b which is formed thereabove. An elevation is formed at a boundary between the thinned portion and the portion lying thereabove, and the coil spring S is securely placed over the spring mounting portion 53 in such a manner as to be stopped by the elevated portion at one end portion thereof.

This spring mounting portion 53 intersects a rotating surface of the spring abutment portion 43, and a groove portion 54 is formed thereon in a direction in which the lower relay rod 51b extends. The spring abutment portion 43 can enter and exit from the groove portion 54 in such a state that the spring abutment portion 43 is biased by the coil spring S by the action of the relay rod 51. The spring abutment portion 43 is brought into abutment with the coil spring S and is not brought into direct abutment with the lower relay rod 51b.

Next, the function of the parking brake apparatus that is configured as has been described heretofore will be described.

In the non-brake-applying state in which the parking brake apparatus does not apply the brake, the tooth 42 of the pawl 40 lies below the toothed portion 32 of the ratchet plate 3, and the tooth 42 is not locked on to the toothed portion 32. When the parking brake apparatus 1 is put into the brake-applying state from the non-brake-applying state, the operating lever 4 only has to be pulled up to rise so as to pull up on the brake cable, so that the operating lever 4 is locked on to the ratchet plate 3.

When the grip 60 is gripped to pull up the operating lever 40 so as to rise so that the parking brake apparatus 1 is caused to apply the brake, the intermediate member 50 which disappears inside the center console 100 is pulled out of the passage hole 101 in the center console 100, and inside the center console 100, the rotational base portion 30 which is connected to the intermediate member 50 is caused to rotate upwards. As the rotational base portion 30 rotates, the brake cable which is connected to the rotational base portion 30 is pulled on to start the application of the brake.

As is shown in FIG. 3, when the tooth 42 of the pawl 40 reaches the toothed portion 32 by virtue of the rotation of the rotational base portion 30, although the tooth 42 of the pawl 40, which is biased by the coil spring S at the spring abutment portion 43 thereof, is locked between teeth of the toothed portion 32, in the event that the operating lever 4 continues to be pulled up to rise, the tooth 42 rides over the associated tooth of the toothed portion 32 and is then locked between the following teeth. This engagement and disengagement of the operating lever 4 with and from the teeth of the toothed portion 32 is repeated until the pulling up of the operating lever 4 is stopped.

When the operating lever 4, which is being pulled up, is stopped at a desired position, the tooth 42 of the pawl 40, which is biased by the coil spring S, is locked on to the toothed portion 32, whereby the operating lever 4 is fixed in place in the position. Since the operating lever 4 is pulled towards a direction in which it returns by the tension of the brake cable, the tooth 42 is locked on to the toothed portion 32 strongly, whereby since the brake cable is held in the pulled state, the parking brake apparatus 1 can be held in the brake-applying state.

As is shown in FIG. 4, when the brake applied by the parking brake apparatus 1 is released, the operating knob 60 which protrudes from the grip is pushed inwards of the grip 60 with the grip 60 slightly pulled up to rise. By slightly pulling up the grip 60 to rise, the brake cable pulls on the operating lever 4 so as to offset a force applied in a direction in which the pawl 40 is locked on to the toothed portion 32 of the ratchet plate 3.

When the operating knob 61 is pushed inwards of the grip 60 in this state, the proximal end portion 62a of the release rod 62 pushes on the end portion 71 of the linkage member 70 to thereby cause the linkage member 70 to rotate. The other end portion 72 pushes up the recess portion 511 by virtue of the rotation of the linkage member 70, whereby the upper relay rod 51b is pushed downwards. The lower relay rod 51b which is connected to the upper relay rod 51a is pushed downwards together with the upper relay rod 51a.

As a result of the lower relay rod 51b being pushed downwards together with the upper relay rod 51 b, the release cam 52 provided at the lower end portion of the lower relay rod 51b is pushed downwards to thereby be brought into direct abutment with the release cam abutment portion 44 of the pawl 40. The release can 52 is pushed against the inclined surface 52a of the release cam 52 to thereby be displace over the inclined surface 52a in a sliding fashion, whereby the release cam abutment portion 44 rotates smoothly in a direction in which the locking of the tooth 42 is released, whereby the locking of the pawl 40 with the ratchet plate 3 is released. As this occurs, the spring abutment portion 43 enters the interior of the groove portion 54 against the biasing force of the coil spring S.

When the pawl 40 is released from the locking with the ratchet plate 3, the brake cable, which has been pulled out, is then withdrawn, and therefore, in the event that the operating lever 4 is allowed to return as pulled by the brake cable so withdrawn, the parking brake apparatus can be restored to the non-brake-applying state.

Since the relay rod 51 is divided into the upper relay rod 51a and the lower relay rod 51b, the rigidity of each of the upper relay rod 51a and the lower relay rod 51b, which are shorter than the single relay rod, is increased, whereby the relay rods are prevented from being distorted or deformed as a whole during their operation, so that the loss of the transmission loss of the relay rod 51 can be reduced, thereby making it possible to realize a secure operation.

In addition, since the relay rod 51, which is in operation, is guided by the guide member 55, the relay rod 51 is prevented further from being distorted or deformed, thereby making it possible to realize a smooth operation of the relay rod 51.

While in the embodiment the relay rod 51 is divided into the two rods; the upper relay rod 51a and the lower relay rod 51b, the relay rod 51 may be divided into three or more rods.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A parking brake apparatus which operates parking brake comprising:

a base comprising a pivot shaft;

a ratchet plate fixed to the base;

an operation lever comprising:

a rotational base portion which is pivotally supported on the base by the pivot shaft at one end portion thereof and to which a brake cable is connected;

a pawl that is pivotably supported on the rotational base and is adapted to engage/disengage with the ratchet plate;

an arc-shaped intermediate member that extends upwards and rearwards from the other end portion of the rotational base portion and comprises an arc-shaped relay rod within an interior thereof; and a grip that is mounted on an upper end portion of the intermediate member at a proximal end portion thereof for controlling the engagement of the pawl with the ratchet plate, wherein the arc-shaped relay rod is divided into at least two and is made to be interlocked with operations by the grip to transmit an engagement/disengagement operation with the ratchet plate to the pawl, the ratchet plate and the rotational base portion are provided inside a body side mounting portion, and the intermediate member is provided in such a manner as to appear from and disappear into a passage hole in the body side mounting portion.

2. The parking brake apparatus as set forth in claim 1, wherein the relay rod which is divided into at least two comprises a connecting portion connecting the divided relay rods, and the connecting portions is guided by an interior wall side of the intermediate member during an operation of the operation lever.

3. The parking brake apparatus as set forth in claim 2, wherein the connecting portion is made up by combining together a raised portion formed at an end portion of one of the relay rods and a recess portion formed on an end portion of the other relay rod.

4. The parking brake apparatus as set forth in claim 1, wherein the grip comprises a release rod, and wherein a rotational link for transmitting operations of the release rod and the relay rod therebetween is provided within a joining portion where the grip and the intermediated member are joined together.

5. The parking brake apparatus as set forth in claim 1, wherein the relay rod comprises, at a lower end portion thereof, a pawl releasing portion which rotates the pawl in a direction releasing an engagement with the ratchet plate.

\* \* \* \* \*